No. 841,104. PATENTED JAN. 15, 1907.
G. A. BAKER.
REFRIGERATING DEVICE.
APPLICATION FILED APR. 5, 1906.
Fig. 1.
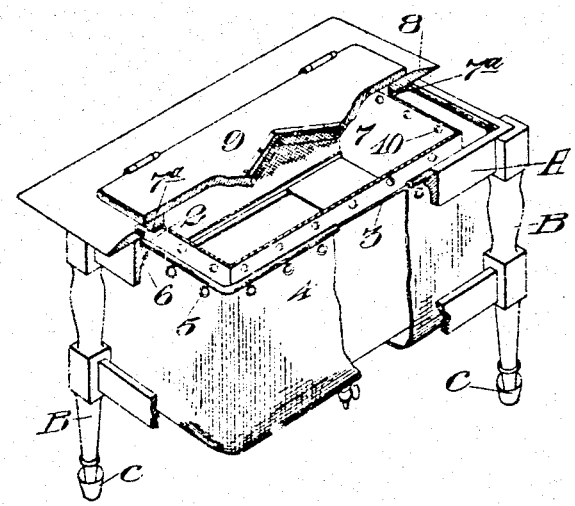
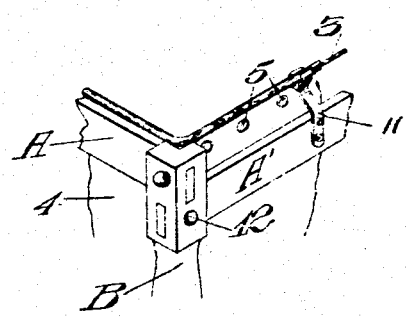
Fig. 2.

UNITED STATES PATENT OFFICE.

GEORGE A. BAKER, OF OAKLAND, CALIFORNIA, ASSIGNOR TO GEORGE GORDON, OF FRUITVALE, CALIFORNIA.

REFRIGERATING DEVICE.

No. 841,104.     Specification of Letters Patent.     Patented Jan. 15, 1907.

Application filed April 5, 1906. Serial No. 310,003.

*To all whom it may concern:*

Be it known that I, GEORGE A. BAKER, a citizen of the United States, residing at Oakland, in the county of Alameda and State of California, have invented new and useful Improvements in Refrigerating Devices, of which the following is a specification.

My invention relates to a device which is designed for refrigerating purposes.

It consists in the combination of parts and in details of construction which will be more fully explained by reference to the accompanying drawings, in which—

Figure 1 is a perspective view of my apparatus, partly in section. Fig. 2 is a partial view in perspective, showing a modification.

It is the object of my invention to provide a simple easily-operated device for preserving perishable substances without the use of ice and to keep it free from ants and like vermin.

A is a frame, which may be rectangular in form and is provided with legs B of sufficient length to support the apparatus at a convenient height. The legs B are preferably inserted in cups C, which contain the liquid to prevent the ants and similar insects from obtaining access to the apparatus. The upper part of the rectangular frame A has a rabbet cut around the inner edge, as shown at 2. 3 is a stout bar or wire bent to fit in this rabbet. 4 is a canvas bag made of a shape to fit the shape of the frame A, and its upper edge is secured to the rod or bar 3, so that when the bar rests in the rabbeted groove the canvas container will be suspended therefrom. This canvas bag is designed to contain water, and after having been saturated with water it will not leak to the extent of allowing water to run out, but will always keep moist, and the water permeating the canvas will be evaporated by the action of the atmosphere and will tend to cool the contained water. In addition to this I have shown a series of holes or eyelets 5 made around the upper periphery of the bag below its suspending-bar and above the surface of the water. This allows the air to also draw through these openings and to increase the evaporating surface to the extent of the exposed upper surface of the water. In order to make these openings as high as possible and at the same time allow convenient access to them, I have shown the upper part of the frame A of the apparatus as having grooves or channels 6 in the lower edge these grooves or channels coinciding with the holes 5, so that while air may be admitted to the holes the upper bar will not be sensibly weakened.

7 is a receptacle which is adapted to fit inside of the water-containing bag 4. This receptacle may be made of sheet metal, and the upper edge is turned outwardly, forming a flange 7ª around the periphery, and by means of this flange the upper edge of the receptacle 7 is secured to a rim 8, having the same shape as the top of the apparatus, and this rim is adapted to rest upon the top of the frame A, thus supporting the receptacle 7 so that its lower portion is submerged in the bag 4.

9 is a cover which may be hinged to the top 8 and serves to close the upper part of the apparatus.

In order to ventilate the interior of the chamber 7 and to also expose it more fully to the cooling action, I have shown this as also perforated with holes 10 around the upper periphery, so that the air may also pass through this chamber, if desired, to add to the cooling effect and also to ventilate the chamber.

By this construction it will be seen that all parts of the apparatus may be readily separated. The interior chamber being removable and the exterior porous bag being similarly removable the whole device can be easily renovated.

As shown in Fig. 2, the side rails A' are tenoned to the posts B lower than the end rails A and also below the holes 5 to allow a more free access of air to the holes 5. 11 is a bracket secured to the rail A' and having its upper end formed with a channel to support the rod 3 and bag where it is otherwise unsupported. There may be as many of these brackets as the length of the spaces on each side require. The legs and frame are preferably mortised and tenoned together and secured by bolts, as at 12, so that they may be readily separated and all parts packed in small space for transportation.

Having thus described my invention, what I claim, and desire to secure by Letters Patent is—

1. A refrigerating device comprising a frame, a bag-like receptacle placed interior to said frame and having a rigid rim portion projecting outwardly and adapted to rest upon the upper edges of the frame, said receptacle being readily removable from the frame and adapted to contain water, and a cover-frame seating upon the rim of the receptacle and having a pendent receptacle adapted to enter the water-chamber of the bag-like receptacle.

2. In a refrigerating device, a frame having a rabbet or groove along the inner periphery of the top, a rod bent to fit said groove, a porous, flexible canvas container having the upper edge fixed to the rod whereby it is removably supported within the frame, a rim adapted to fit the top of the frame, an inner receptacle having its upper edge fixed to said rim so as to be submerged within the porous container, or removed therefrom, said canvas container having air-inlets around its upper portion circulating air over and through the apparatus.

3. In a refrigerating device, a frame supported upon legs having a groove or rabbet along the inner periphery at the upper part, a rod or bar bent to fit said rabbet, a porous flexible canvas container having its upper edge fixed to the rod and suspended thereby within the frame, said container having holes made around the upper periphery for the circulation of air over the surface of the contained liquid, an inner metal receptacle, a rim to which the upper edge of the receptacle is fixed, said rim resting upon the outer frame so that the receptacle may be submerged within the water in the outer container, said container having openings through which air may also circulate above the surface of the water.

4. In a refrigerating device, a rectangular frame having legs, and a rabbeted rim at the top, a correspondingly-shaped flexible canvas water-container, a bent bar to which the upper edge of the container is secured, and which bar fits the rabbet of the frame, a cap-piece adapted to rest upon the top of the frame, a receptacle secured to said cap-piece and removable therewith, a cover by which the receptacle may be closed, said container and receptacle having eyelet-holes and perforations made around the periphery above the surface of the water.

In testimony whereof I have hereunto set my hand in presence of two subscribing witnesses.

GEORGE A. BAKER.

Witnesses:
S. H. NOURSE,
D. B. RICHARDS.